Nov. 24, 1925.
C. FROESCH
1,563,022
SPRING SUSPENSION
Filed May 22, 1925
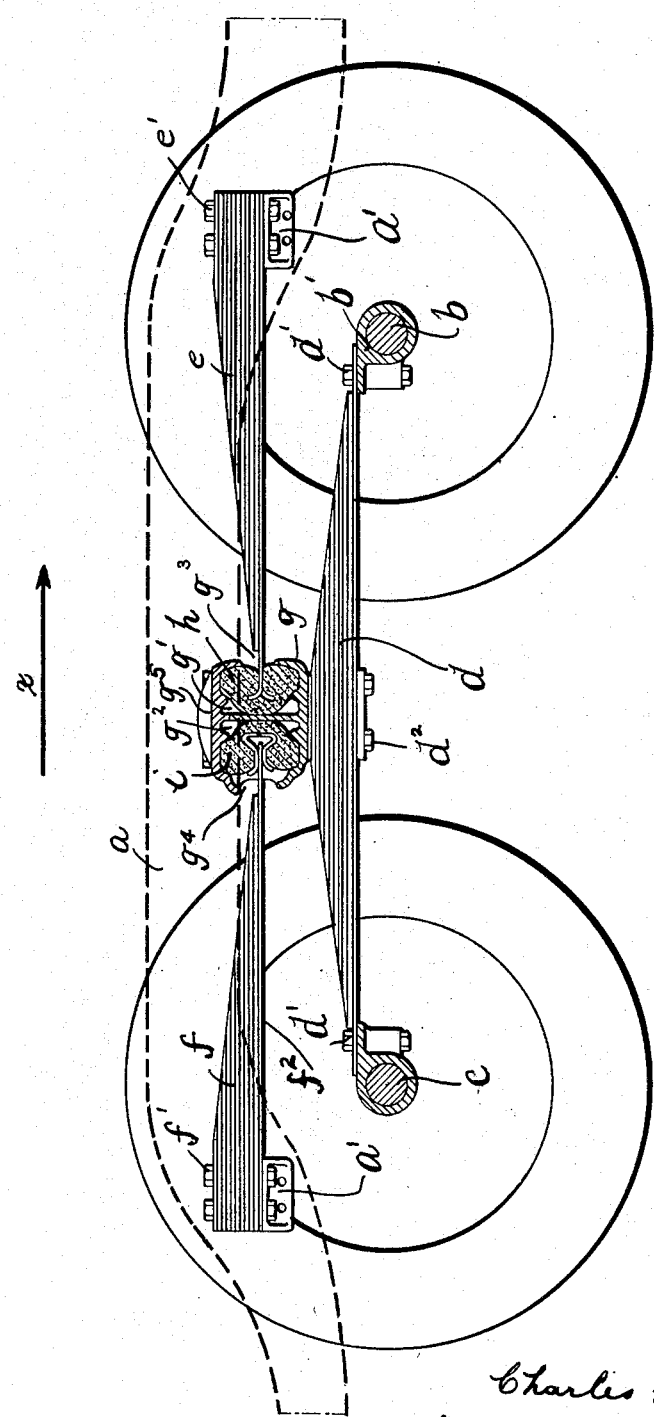
Inventor
Charles Froesch
By his Attorney
Redding, Greeley, O'Shea & Campbell Patented Nov. 24, 1925.

1,563,022

UNITED STATES PATENT OFFICE.

CHARLES FROESCH, OF NEW YORK, N. Y., ASSIGNOR TO INTERNATIONAL MOTOR COMPANY, OF NEW YORK, N. Y., A CORPORATION OF DELAWARE.

SPRING SUSPENSION.

Application filed May 22, 1925. Serial No. 31,993.

*To all whom it may concern:*

Be it known that I, CHARLES FROESCH, a citizen of the United States, residing in the borough of Manhattan, of the city of New York, in the State of New York, have invented certain new and useful Improvements in Spring Suspensions, of which the following is a specification, reference being had to the accompanying drawing, forming a part hereof.

This invention relates to spring suspensions for motor vehicles and more particularly to such suspensions for dual axles thereof. It has for its object to provide a spring suspension which shall have a light unsprung weight, shall involve the least number of joints and have a comparatively low manufacturing cost while at the same time conforming to standard automotive practice. According to the invention a leaf spring is secured at its ends to the respective dual axles and cantilever springs carried with the vehicle frame are adapted to be connected at their ends to the mid-point of the first named spring. In order to provide a spring construction which shall allow a limited degree of relative movement between the respective axles whereby the wheels are permitted to track somewhat when the vehicle is turned, a yielding connection is provided between the ends of the cantilever springs and the mid-point of the spring connecting the respective axles. This yielding connection may further serve the purpose of cushioning or absorbing in whole or in part shocks and stresses impressed upon the wheels which would otherwise be transmitted in whole or in part to the chassis frame. More particularly, a housing is secured to the mid-point of the spring which connects the respective axles and this housing is formed with opposed recesses adapted to receive the ends of the respective cantilever springs, yielding non-metallic material being disposed within the respective housings, and preferably under compression, to engage the springs and provide the yielding connection therebetween. The yielding non-metallic material preferably comprises rubber and is retained under compression since by so retaining the rubber its resiliency, strength and life are increased. The invention will now be described more particularly with reference to the accompanying drawing illustrating a preferred embodiment thereof wherein a spring suspension for dual rear axles at one side of the vehicle is illustrated.

Referring to the drawing a longitudinal side frame member of the vehicle chassis is indicated at $a$ and dual rear axles are indicated at $b$ and $c$, respectively, the vehicle being adapted to travel normally in the direction indicated by the arrow $x$ so that the axle $b$ is the forwardly disposed one of the pair. A leaf spring $d$ connects the respective axles and is connected at its ends to the axles in any convenient manner as by the bolts $d'$ which secure the ends of the longest leaf of the spring to brackets such as $b'$ carried with the axle $b$. Secured to the frame member $a$ are cantilever springs $e$, $f$, the ends of the cantilever springs being proximate to one another and to the mid-point of the spring $d$. Springs $e$ and $f$ are connected rigidly to the frame member $a$ as by bolts $e'$, $f'$, or the like rigidly securing the springs to brackets $a'$ carried with the vehicle frame.

The proximate ends of the cantilever springs are preferably secured to the mid-point of the spring $d$ by yielding non-metallic connections. To provide such connections a housing $g$ formed with opposed recesses $g'$, $g^2$, is rigidly secured to the mid-section of the spring $d$ as by the bolts $d^2$. The housing $g$ is provided with openings $g^3$, $g^4$, in opposed walls through which the ends of the springs extend and blocks of yielding non-metallic material $h$, $i$, are retained within the respective recesses $g'$, $g^2$, to engage the ends of the respective springs.

When the axles $b$, $c$, are the propelling axles and the drive is transmitted through the springs as in the Hotchkiss drive it will be found advisable to secure the end of the spring $e$ within the housing $g$ substantially fixedly and to this end the recess $g'$ takes such configuration that the block $h$ engages tightly the end of the spring. The lower surface of spring $f$ as at $f^2$ is given a slight inverted camber and the end of the spring within the housing $g^2$ is retained within a connection which may be termed floating in that the shape of the recess is such as to permit a greater freedom of movement of the block $i$.

In order to facilitate assembly of the construction the housing $g$ will conveniently be formed in two parts whereof the cap portion $q^5$ is removable to permit the insertion of the blocks of yielding non-metallic material within the recesses.

It will thus be seen that a spring suspension is provided which is applicable in motor vehicles employing the Hotchkiss drive and which involves only five connections, four of which are rigid while the fifth comprises a yielding connection which facilitates substantial tracking of the wheels and cushions any shocks or stresses which may be impressed thereon. The major portion of the weight of the suspension is sprung and it involves comparatively few parts which may be very simply assembled.

The invention is not to be deemed limited to the particular configuration of the component elements going to make up the spring suspension nor to the employment of yielding non-metallic material as a connection between the three springs.

What I claim is:

1. In a spring suspension for vehicles having dual axles, a spring secured at its ends to the respective axles, springs carried with the vehicle frame and means to connect the ends of said springs to the first named spring between the ends thereof.

2. In a spring suspension for vehicles having dual axles, a leaf spring secured at its ends to the respective axles, cantilever springs carried with the vehicle frame, and means to connect the ends of said cantilever springs to the mid-point of the first named spring.

3. In a spring suspension for vehicles having dual axles, a spring secured at its ends to the respective axles, springs carried with the vehicle frame, and means to connect the free ends of said springs to the first named spring between its ends comprising yielding non-metallic material.

4. In a spring suspension for vehicles having dual axles, a spring secured at its ends to the respective axles, cantilever springs carried with the vehicle frame, housings carried with said first named spring between its ends, said cantilever springs extending, respectively, within the housings and yielding non-metallic material retained within the housings and engaging the ends of the cantilever springs, respectively.

5. In a spring suspension for vehicles having dual rear driving axles, a leaf spring rigidly secured at its ends to the respective axles, cantilever springs carried rigidly with the vehicle frame, a housing formed with opposed recesses carried with the first named spring between its ends into which recesses the ends of the cantilever springs extend, respectively, blocks of yielding non-metallic material retained within the respective recesses and engaging the ends of the springs, one of said blocks affording a relatively fixed connection and the other of said blocks affording a floating connection.

This specification signed this 20th day of May A. D. 1925.

CHARLES FROESCH.